Inventor:
PAUL PROFOS.
By K.A. Mayr
Attorney

United States Patent Office 3,162,242
Patented Dec. 22, 1964

3,162,242
TEMPERATURE CONTROL OF AN INDIRECT
HEAT EXCHANGER
Paul Profos, Winterthur, Switzerland, assignor to Sulzer
Freres, S.A., Winterthur, Switzerland, a corporation of
Switzerland
Filed Aug. 22, 1960, Ser. No. 51,109
Claims priority, application Switzerland Sept. 8, 1959
8 Claims. (Cl. 165—32)

The present invention relates to a system for regulating the temperature of an operating medium leaving an indirect heat exchanger by controlling the temperature of the medium entering the heat exchanger, for example for regulating the temperature of the steam leaving the superheater of a steam generator by controlling the temperature of the steam entering the superheater, for example, by controlled water injection.

The temperature control of heat exchangers in which the paths of the heat exchanging media have considerable lengths is difficult, because it takes considerable time until a change of the temperature or heat content of a medium entering the heat exchanger is noticed in the same medium leaving the heat exchanger. This time lag corresponds essentially to the travel time of the medium through the heat exchanger. In order to overcome this difficulty superheaters of steam generators have been subdivided into a plurality of sections and temperature control means have been provided for each section. This subdivision requires additional headers, additional valves for injecting a coolant into the superheater sections, and additional control apparatus. There is, therefore, a limit for shortening the length of the path of the steam in the superheater which limit is determined by the initial cost and cost of upkeep of the superheater sections and connections and control apparatus associated therewith.

It is an object of the present invention to provide a quick-acting temperature control system for a heat exchanging medium which requires considerable time to travel from one end to the other end of a heat exchanger. The system according to the invention does not require subdivision of the heat exchanger to reduce the length of the path of the heat exchanging medium through the heat exchanger. In the system according to the invention the temperature of a medium entering a heat exchanger is controlled, for example, by controlled injection of a coolant into the medium, whereby the control is not only responsive to the temperature of the medium leaving the heat exchanger but is also responsive to the temperature of the medium while it passes through the heat exchanger.

An apparatus according to the invention comprises means for controlling the temperature of a heat exchanging medium entering a heat exchanger, means responsive to the temperature of the medium leaving the heat exchanger, and at least one means responsive to the temperature of the medium while it passes through the heat exchanger, said temperature responsive means being operatively connected to the means for controlling the temperature of the heat exchanging medium entering the heat exchanger, the first mentioned temperature responsive means including integrating means making the produced signal dependent upon the duration of the deviation of the temperature of the medium leaving the heat exchanger from a predetermined value, and said second mentioned temperature responsive means being adapted to produce a signal which is directly proportional to every change of the temperature of the medium passing through the heat exchanger.

The novel features which are considered characteristic of the invention are set forth with particularity in the appended claims. The invention itself, however, and additional objects and advantages thereof will best be understood from the following description of embodiment thereof when read in connection with the accompanying drawing, wherein:

Figure 1:
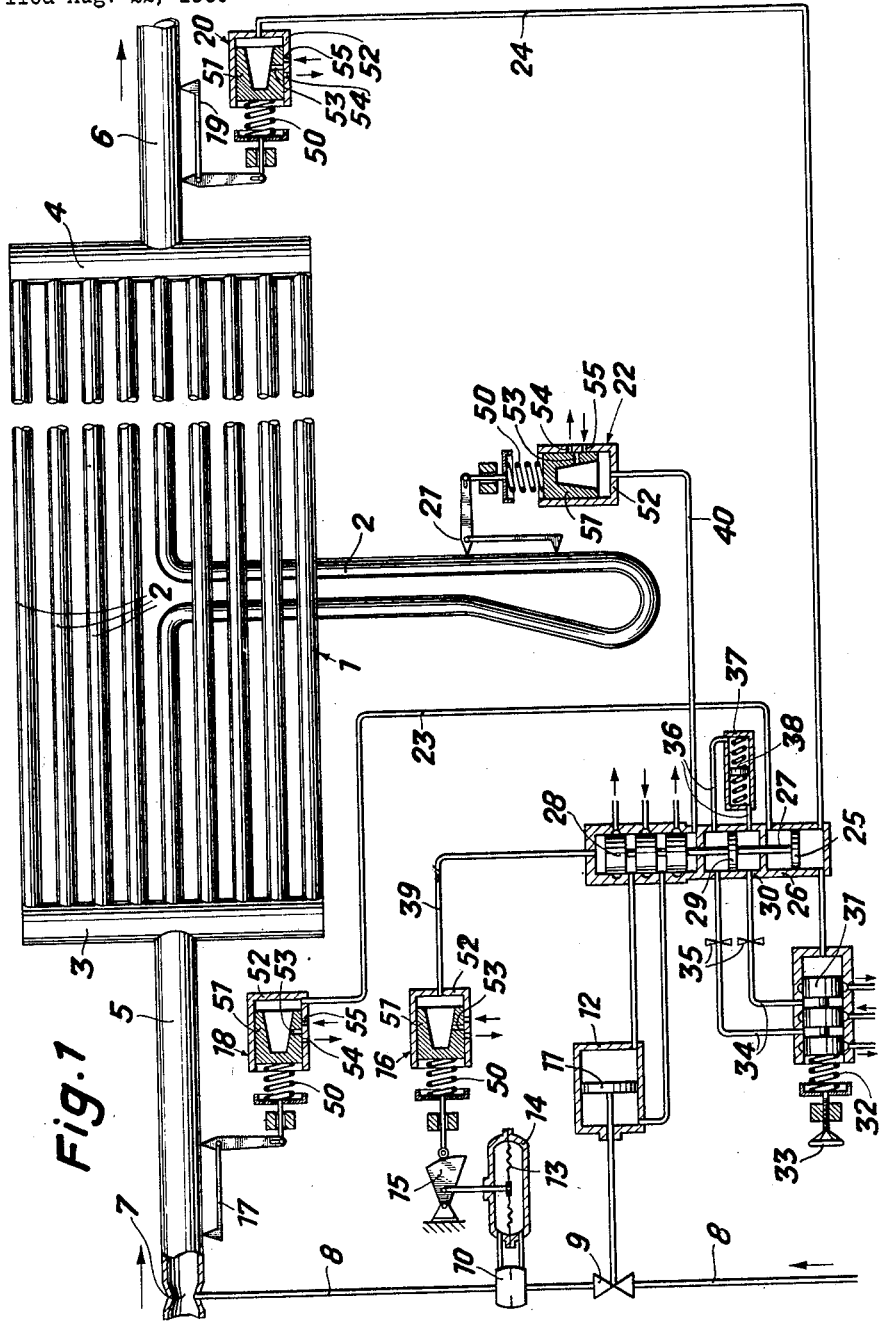
FIG. 1 is a diagrammatic illustration of a system according to the invention as used in combination with superheater of a steam generator.

Referring more particularly to FIG. 1 of the drawing numeral 1 designates a superheater having a plurality of tubes 2 whose inlet ends are connected to a header 3 and whose outlet ends are connected to a header 4. Steam to be superheated is supplied to the header 3 by means of an inlet pipe 5. The superheated steam flows from the header 4 into an outlet pipe 6. Water is injected at 7 as a coolant into the pipe 5. The water is supplied through a pipe 8 which is connected to a source of water, no shown, for example, to the feed pump of the steam generator of which the superheater 1 forms a part. A flow measuring device 10 and a control valve 9 are interposed in the pipe 8. The valve 9 is controlled by a hydraulic motor operator 12 including a piston 11 which is suitably connected to the valve 9 for operating the latter. The flow measuring device 10 produces a pressure differential acting on a diaphragm 13 placed in a casing 14 and actuating through a cam 15 a signal-producing device 16. The temperature of the steam entering the superheater through the pipe 5 is measured by a temperature sensitive device 17 which actuates a hydraulic signal producer 18. The temperature of the steam leaving the superheater through the pipe 6 is measured by a temperature sensitive device 19 which actuates a hydraulic signal producer 20. The superheater 1 is heated, for example, by heat produced by burning fuel. One of the tubes 2 is so arranged that it has a portion which is not heated by the products of combustion. This portion is provided with a temperature sensitive device 21 actuating a hydraulic signal producer 22.

The signal producers 18 and 20 are connected by signal conduits 23 and 24 to spaces in a cylinder 26 on different sides of a piston 25 which is adapted to reciprocate in the cylinder 26. The piston 25 is connected by a piston rod 27 to a piston valve 28 which controls the supply of a pressure fluid to and from the motor operator 12. A piston 29 reciprocating in a cylinder 30 is connected to the rod 27. Supply of pressure fluid to the spaces in the cylinder 30 on the sides of the piston 29 is controlled by mean of a piston valve 31 actuated by a spring 32 whose tension can be adjusted by manipulating a hand wheel 33. The spring 32 presses the piston valve 31 to the right against the pressure of the pressure fluid in the signal conduit 24 A throttling device 35 is interposed in each of the conduits 34 connecting the piston valve 31 to the chambers on either side of the piston 29 in the cylinder 30 These chambers are individually connected by means of pipes 36 to chambers in a cylinder 37 on the sides of a piston 38 which is held in a middle position by means of springs located in the cylinder 37. The chambers at the ends of the piston valve 28 are individually connected by pipes 39 and 40 to the signal producers 16 and 22, respectively.

Each of the hydraulic signal producers 16, 18, 20 and 22 comprises a cup-shaped piston 51 which is pressed into a cylinder 52 by means of a spring 50. Each of the pistons 51 is provided with a radial channel 53 which controls supply of a pressure fluid into and relief of the pressure fluid from the cylinder 52 through ports 55 and 54. If the pistons 51 of the devices 16, 18 and 20 are oved to the right and if the piston 51 of the device 22 moved downward, the ports 55 are opened and pressure id is admitted into the cylinder 52 so that the pressure the signal conduits 39, 23, 24 and 40 is increased. If, example, the piston 51 of the signal producer 18 is oved to the left, the port 54 is opened, permitting discharge of pressure fluid from the cylinder whereby the essure in the signal conduit 23 is reduced. The pressures acting on the pistons 51 are in equilibrium with the essures exerted by the springs 50 and the pressures in e respective signal conduits individually correspond to e pressures produced by the springs 50. The temperature sensitive devices 17, 19 and 21 include feelers made a material having a lower heat expansion coefficient in the material of which the pipes 5, 6 and 2 are made. e end of each feeler is connected to the pipe whose mperature must be measured. The other end of each ler acts on a lever having an arm whose end abuts ainst the respective pipe and cannot move longitudinally of the pipe. This end acts as a fulcrum affording inging of the lever upon a difference of the length of e feeler and of the respective pipe between the end of e feeler and the end of the lever arm engaging the pipe. the temperature or heat expansion of the pipes 6 and n FIG. 1 increases, a pressure is exerted on the respective springs 50. The temperature sensitive device 17 is arranged that the pressure of the spring 50 of the signal producer 18 is reduced upon an increase of the temperature or heat expansion of the pipe 5.

If, for example, the temperature of the pipe 6 or of the es 2 increases, the pressure in the signal conduits 24 d 40 increases so that the piston valve 28 is moved upward, permitting flow of pressure fluid into space at the t side of the piston 11. The latter, therefore, moves the right and opens the valve 9 so that more cooling uid is supplied at 7 into the pipe 5. This counteracts emperature increase in the pipe 6. A temperature increase in the pipe 5 causes a reduction of the pressure in e pipe 23 and in the space above the piston 25 and has e same effect as an increase of the temperature of the pe 6. The flow measuring device 10 and the signal oducer connected thereto react to conditions, for example pressure changes, in the pipe 8 upstream of the valve and produce control signals in the device 16 which act the piston 28 and therefore also on the valve 9 so that e actuation of the latter is corrected when this is required by changing flow or pressure conditions in the pe 8.

The piston valve 31 is moved to the left in FIG. 1 upon rise of the pressure in the signal conduit 24 so that pressure fluid is supplied into the lower chamber of the cylinder 30 and is relieved from the upper chamber of the linder 30. The displacement of the piston valve 31 to e left remains until the temperature in the outlet conduit returns to the temperature adjusted by the hand wheel . The device 37 including the spring-loaded piston 38 d the throttling elements 35 make the difference of the essures acting on the piston 29 dependent upon the duion of the displacement of the piston valve 31.

The cam drive 15 interposed between the flowmeter 10, , 14 and the signal-producing device 16 effects a desired, : example linear, relation between the rate of flow of e medium in the pipe 8 and the signal produced by the vice 16. In this way, the sensitivity of the control can held independent of the amount of liquid injected into e inlet conduit 5.

The piston valve 28 with the pistons 25 and 29 connected thereto and the piston valve 31 cooperating with e device 37 represent a control system having a proportional-integral character, which system receives its set int from the force exerted by the spring 32 on the pis1 valve 31.

The aforedescribed control system combines the signals produced by the temperature sensitive devices 17, 19 d 21 and the signals produced by the rate of flow measuring device 10, 13, 14. The main signal is derived from the temperature sensitive device 19, the temperature sensitive device 21 producing an advance- or pre-signal. Only the signal produced by the device 20 acts on the valve 31 which imparts an integral characteristic; the signal produced in the device 22 acts directly on the pilot valve 28 and no integral characteristic is imparted thereto.

Figure 2:
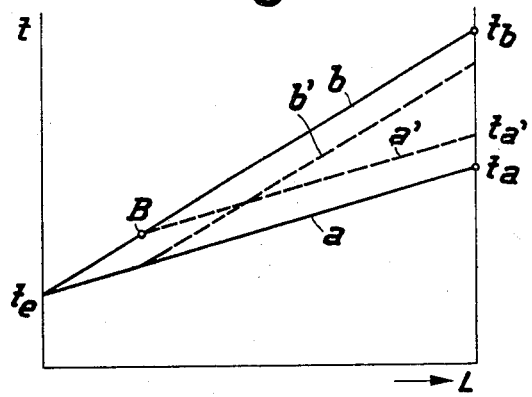
FIG. 2 is a diagram showing average temperature conditions of the steam traveling through a superheater.

The diagram FIG. 2 shows the temperature of a heat exchanging medium passing through a heat exchange conduit, for example a pipe of a superheater, having the length L. The lines $a$ and $b$ show the temperatures of the medium entering the heat exchanging conduit at the temperature $t_e$ at two different heating or firing intensities, the heating intensity producing the line $a$ being smaller and the heating intensity producing the line $b$ being greater. The point $t_a$ represents the temperature of the medium leaving the superheater when the latter is heated at relatively small heat intensity and the point $t_b$ represents the temperature of the medium leaving the superheater when the superheater is heated at relatively great heat intensity. If, during operation of the heat exchanger, the firing intensity is changed, the temperature of the medium to be heated is simultaneously changed along the entire heating surface. The dotted line $a'$, which is parallel to the line $a$ in FIG. 2, represents the temperature of the medium to be heated at a certain moment after the heating intensity has been increased. The line $a'$ moves upward in the diagram parallel to the line $a$ and the point of intersection B of the lines $a'$ and $b$ moves to the right at a speed which depends on the speed of flow of the medium through the heat exchanger. The point B finally coincides with the point $t_b$, when the outlet of the heat exchanger has reached the temperature corresponding to the new increased fire intensity. The diagram makes it obvious that a point which is relatively close to the inlet of the heat exchanger reaches a temperature corresponding to the new fire intensity much earlier than a point close to the outlet of the heat exchanger.

Similarly, a line $b'$ moves downward parallel to the line $b$ upon a reduction of the fire intensity.

If only the outlet of the heat exchanger would be provided with a temperature sensitive device 19, this device would sense the temperature corresponding to a new fire intensity only after a period of time which corresponds to the time of travel of the heat exchanging medium through the heat exchanger. A temperature sensitive device 21 which is provided closer to the inlet of the heat exchanger is affected much earlier by the temperature corresponding to the changed heating intensity and senses the change of heating intensity and can be used much earlier for counteracting the change of heating intensity.

The temperature sensitive device 21 is preferably connected to a heat exchanging conduit of the heat exchanger at a point which is between the first 3% and the first 50%, for example at the first 25%, of the total length of the heat exchanging conduit, with respect to the flow of the medium therethrough. Connection of the heat sensitive means 21 in this region provides optimum conditions for the opposing effects of the magnitude of the temperature change and the speed at which it is sensed.

The temperature sensitive device 17 shown in FIG. 1 at the inlet of the heat exchanger is not absolutely essential for the system according to the invention and may be omitted. Providing the temperature sensitive device 17 makes the control more sensitive since it reacts already to a change of the inlet temperature of the heat exchanging medium.

Figure 3:
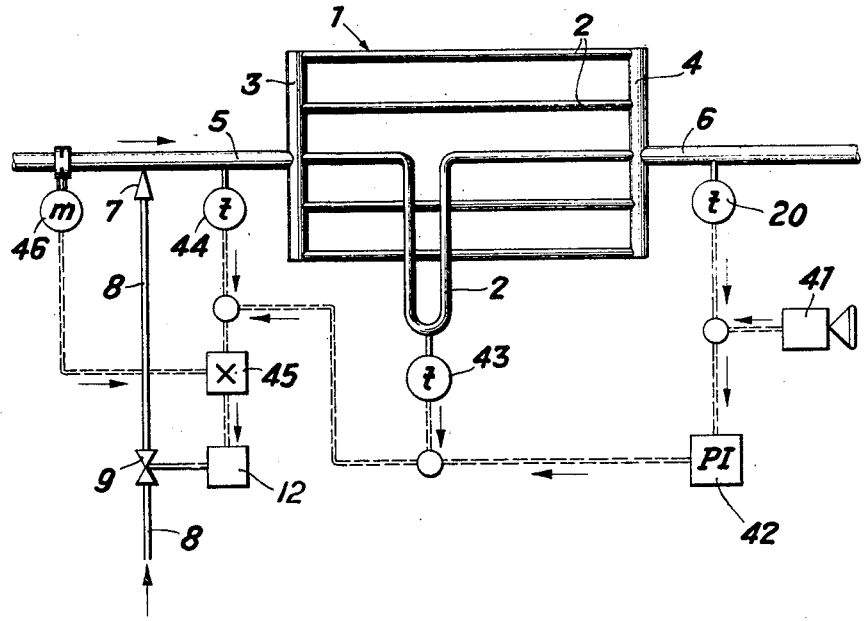
FIG. 3 is a diagrammatic illustration of a modified system according to the invention as applied to a superheater of a steam generator.

As shown in FIG. 3, a rate of flow measuring device 46 may be connected to the inlet conduit 5 of the heat exchanger.

FIG. 3 shows a temperature sensitive device 20 connected to the outlet conduit 6 of the heat exchanger 1 which produces control signals in a device 42 having a proportional-integral character, whose set point is controlled by a set point setting device 41. The signal produced in the device 42 is added to a signal produced by a temperature sensitive device 43 which corresponds to the temperature sensitive device 21 in FIG. 1. The signal produced by the device 43 has a proportional character only, no integrating means being connected to the device 43. The sum of the signals produced in 42 and in 43 is added to signals produced by a temperature sensitive device 44 connected to the inlet conduit 5 and corresponding to the temperature sensitive device 17 in FIG 1. The resulting signal is multiplied in a multiplication device 45 by the signal produced by a rate of flow meter 46 which is connected to the inlet conduit 5 upstream of the point 7 where cooling liquid is injected into the inlet conduit. The signal produced in the device 45 is used for actuating a motor operator 12 which controls the valve 9. By introducing the signal corresponding to the rate of flow of the heat exchanging medium through the heat exchanger, adaptation of the control to different throughputs of the heat exchanger is improved.

The system according to the invention produces a quickly responsive control of a heat exchanger without subdivision of the heat exchanger into several parts and without the necessity of providing additional headers, collectors, injecting apparatus and controls therefor.

Though the system according to the invention is described and illustrated as applied to superheaters, it is obvious that the system is applicable to a great variety of indirect heat exchangers, for example, to heat exchangers as used in nuclear reactor power plants.

It is also obvious that the apparatus according to the invention may be modified without departing from the scope of the invention, for example, by providing, instead of only one, a greater number of temperature sensitive devices 21. These devices may be arranged in spaced and series relation, or in parallel relation on different heat exchanging conduits. The advance signals produced by the intermediate temperature sensitive devices may have a proportional or a differential character. The invention may be implemented not only by hydraulic devices as shown and described but also, for example, by electric devices.

I claim:

1. The combination of a heat exchanger and a temperature control system therefor, comprising:
    a tube system having an inlet and an outlet,
    a fluid to be heated entering said tube system through said inlet and leaving said tube system through said outlet,
    means for controlling the temperature of the fluid entering said tube system,
    first temperature responsive means connected to said outlet for producing a first control signal corresponding to the temperature of the fluid leaving said tube system,
    a device having a proportional-integral character and connected to said first temperature responsive means for receiving said first control signal therefrom for producing a regulating signal,
    second temperature responsive means connected to said tube system for producing a second control signal corresponding to the temperature of the fluid at a point of said tube system between said inlet and said outlet,
    said second temperature responsive means being operatively connected to said device for combining said regulating signal and said second control signal, and
    a motor operator operatively connected to said means for controlling the temperature of the fluid entering said tube system and to said device for receiving the combined regulating and second control signal therefrom and being capable of operation in response to the combined signal.

2. The combination defined in claim 1 wherein said second temperature responsive means includes a device having a proportional characteristic.

3. The combination defined in claim 1 wherein said tube system comprises a plurality of tubes arranged in parallel relation with respect to the flow of the fluid to be heated, said second temperature responsive means being connected to one only of said tubes.

4. The combination defined in claim 3 wherein said second temperature responsive means is connected to one of said tubes at a point which is between the first three percent and the first fifty percent, measured from said inlet, of the total length of the tube to which said second temperature responsive means is connected.

5. The combination defined in claim 1 comprising third temperature responsive means connected to said inlet for producing a third control signal corresponding to the temperature of the fluid entering said tube system, said third temperature responsive means being operatively connected to said device for combining said third control signal with said regulating signal and said second control signal.

6. The combination defined in claim 1 comprising flowmeter connected to said inlet for producing a signal corresponding to the rate of flow of the fluid to be heated into said tube system, said flowmeter being operatively connected to said device for combining said rate of flow signal with said regulating signal and said second control signal.

7. The combination of a heat exchanger and a temperature control system therefor, comprising:
    a tube system having an inlet and an outlet,
    a fluid to be heated entering said tube system through said inlet and leaving said tube system through said outlet,
    means for controlling the temperature of the fluid entering said tube system,
    a motor operator for actuating said temperature control means,
    an automatic controller operatively connected to said motor operator for controlling the operation thereof,
    first temperature responsive means connected to said outlet for producing a first control signal corresponding to the temperature of the fluid leaving said tube system,
    set point signal producing means operatively connected to said first temperature responsive means for receiving said first control signal therefrom and including means capable of comparing said first control signal with said set point signal, and
    second temperature responsive means connected to said tube system for producing a second control signal corresponding to the temperature of the fluid flowing in said tube system,
    said controller being operatively connected to said first and to said second temperature responsive means for receiving said first and said second control signal and being capable of being actuated by said signals,
    said controller including means operatively connected to said comparing means and affording actuation of said controller by said first and second control signal upon a deviation of said first control signal from said set point signal and impeding actuation of said controller by said first and second control signal upon equality of said first control signal and of said set point signal.

8. The combination of a superheater and a temperature control system therefor, comprising:
    a tube system having an inlet and an outlet,
    steam to be superheated entering said tube system through said inlet and leaving said tube system through said outlet,
    cooling water injection means connected to said inlet for injecting water into the steam for controlling the temperature of the steam,
    flow rate control means connected to said water injection tion means for controlling the rate of flow of cooling water injected into the steam, first temperature responsive means connected to said outlet for producing a first control signal corresponding to the temperature of the superheated steam leaving said tube system, a device having a proportional-integral character and connected to said first temperature responsive means for receiving said first control signal therefrom for producing a regulating signal, second temperature responsive means connected to said tube system for producing a second control signal corresponding to the temperature of the steam at a point of said tube system between said inlet and said outlet, said second temperature responsive means being operatively connected to said device for combining said regulating signal and said second control signal, and a flowmeter connected to said water injection means for producing a signal corresponding to the rate of flow of water injected into the steam, said flowmeter being operatively connected to said device for combining said rate of flow signal with said regulating signal and said second control signal.

References Cited in the file of this patent

UNITED STATES PATENTS

| | | |
|---|---|---|
| 1,750,001 | Godfrey | Mar. 11, 1930 |
| 2,155,986 | Wheaton | Apr. 25, 1939 |
| 2,217,636 | Rude | Oct. 8, 1940 |
| 2,317,480 | Peters | Apr. 27, 1943 |
| 2,572,253 | Fellows et al. | Oct. 23, 1951 |
| 2,762,385 | Smerke | Sept. 11, 1956 |
| 2,951,687 | Schulenberg et al. | Sept. 6, 1960 |
| 2,966,896 | Vogler | Jan. 3, 1961 |